(12) United States Patent
Simon et al.

(10) Patent No.: US 10,987,595 B1
(45) Date of Patent: Apr. 27, 2021

(54) GAME PUBLISHER AND BROADCASTER INTEGRATION PLATFORM

(71) Applicant: Amazon Technologies, Inc., Seattle, WA (US)

(72) Inventors: Leonard Simon, Seattle, WA (US); Xiaolin Cui, Bellevue, WA (US); Alfred Yong-Hock Tan, Bellevue, WA (US); Emmett Shear, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 526 days.

(21) Appl. No.: 15/087,547

(22) Filed: Mar. 31, 2016

(51) Int. Cl.
*A63F 13/86* (2014.01)
*A63F 13/792* (2014.01)
*A63F 13/35* (2014.01)

(52) U.S. Cl.
CPC .............. *A63F 13/86* (2014.09); *A63F 13/35* (2014.09); *A63F 13/792* (2014.09)

(58) Field of Classification Search
CPC .......... A63F 13/86; A63F 13/792; A63F 13/35
See application file for complete search history.

(56) References Cited

U.S. PATENT DOCUMENTS

2010/0030660 A1* 2/2010 Edwards ................ G06Q 30/00 705/26.1

* cited by examiner

*Primary Examiner* — Tramar Harper
*Assistant Examiner* — Thomas H Henry
(74) *Attorney, Agent, or Firm* — BakerHostetler (57) ABSTRACT

A videogame services platform may include a streaming component that streams audio and video of gameplay performed on a first client device. The platform may identify content present in the stream and provide notification, to a broadcaster portal, that content present in the stream is available for purchase. An identifier of the content may be mapped to a stock keeping unit for a product containing the content. The product may be acquired using the stock keeping unit. The second client device may be updated to make the content available and authorized for use in gameplay on the second client device.

20 Claims, 9 Drawing Sheets

GAME PUBLISHER AND BROADCASTER INTEGRATION PLATFORM

BACKGROUND

Videogame streaming has become a prevalent aspect of the videogame industry. Typically, videogame streaming involves the broadcast of the video and audio components of a videogame to a potentially large number of viewers. In some cases, the gamer who broadcasts his or her gameplay does so in conjunction with an additional audio and video stream of the gamer, who may offer commentary on the game as it is played. In some cases, the gamer is also notable, for example due to his or her reputation or skill in the game being broadcast.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Disclosed herein are systems, methods, and computer program products pertaining to a videogame services platform. The videogame services platform may include elements for streaming the gameplay of a videogame to recipient devices, and for identifying content featured in the stream. The identified content may be readily acquired by the recipient devices, such that the content may be incorporated into gameplay performed on those devices.

A videogame broadcaster may operate a portal site in which live or archived streams of videogames, or other audio or video content, is made available to the portals users. The videogames, or other content, is typically provided by a content publisher. For example, a videogame publisher might provide a videogame. The broadcaster might then utilize streaming services to produce a live or recorded stream of the broadcaster playing the videogame, and provide access to the live or recorded stream through the portal. The broadcaster might receive, from the videogame services platform, information indicative of items in the stream that correspond to one or more products available for acquisition. The broadcaster might promote these products on the portal interface or in a simulcast of the recording or stream. A viewer of the recording or stream might acquire the products, and the broadcaster might receive credit for the sale of the products.

In an example, a first client device operates a videogame and is the origin of a stream of gameplay broadcast to other devices, including a second client device. The videogame services platform may receive information indicative of this stream, such as metadata describing content items appearing in the stream. Using this metadata, the videogame services platform may identify a content item appearing in the stream. The identified content item may, moreover, be determined to be available for use in the gameplay of a second client device, and the second client device may then be provided with information indicating that the content is available.

The videogame services platform may receive an indication that the second content should be made available to the gameplay of the second client device. For example, the videogame services platform may receive a request to purchase the content, or to purchase a bundle of content containing the content viewed in the videogame stream. In some cases, the videogame services platform may receive a message from an online store indicating that the content has been purchased. In either case, a mapping may be made from an identifier of the content viewed in the stream and a stock keeping unit (or other code) of a product that may be purchased. Once the product has been purchased, the message may be sent from the online store to a fulfillment component of the videogame services platform. In some instances, the product may be purchased (or otherwise acquired) by a user of the second client device as that user operates the second client device. In other instances, the user may purchase the product on another device such as a mobile phone, and be enabled to use the product on the second client device. In other instances, another entity may purchase or otherwise acquire the content on behalf of the user.

Upon receiving the message, the videogame services platform may cause the game data of the second client device to be updated. The updating may involve downloading the content, if the content has not already been downloaded. The updating may further involve modifying the game data to reflect that the content viewed in the stream is authorized for use in gameplay on the second client device. More generally, the game content may be updated to enable use of the content.

Figure 1:
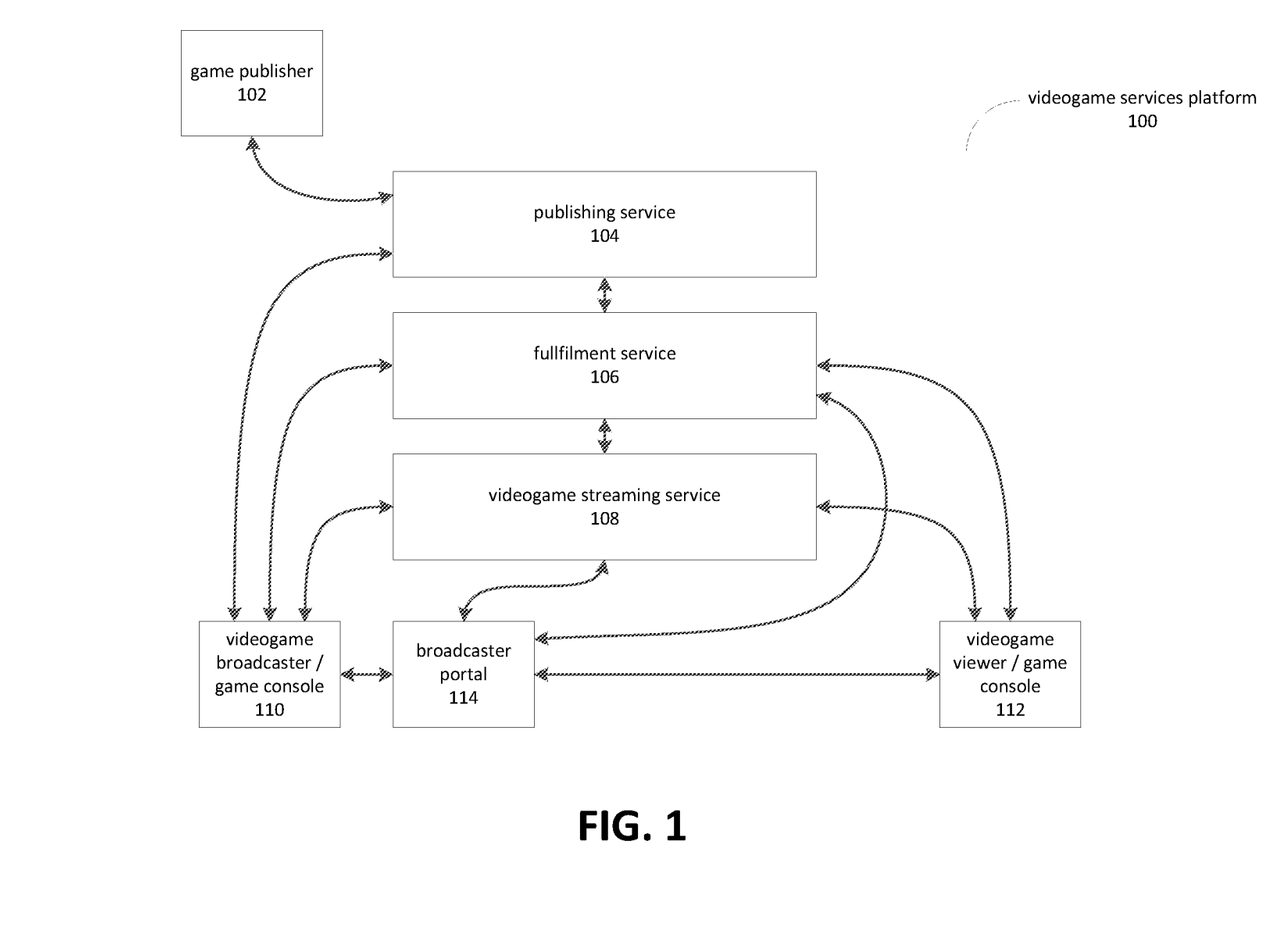
FIG. 1 is a block diagram depicting a videogame services platform.

FIG. 1 is a block diagram depicting a videogame services platform 100. The videogame services platform 100 may include various aspects related to providing experiences such as playing, viewing, and acquiring videogames and related videogame content. For example a videogame broadcaster 110 may play a videogame and provide a broadcast of its content, via a videogame streaming service 108, to a videogame viewer 112. A videogame broadcaster may be a computing device, such as a gaming console, tablet or phone, which is a client device of the videogame services platform 100. Similarly, videogame viewer 112 may also be a computing device such as a gaming console, tablet, or phone, which is also a client device of the videogame services platform 100.

Both the videogame broadcaster 110 and the videogame viewer 112 may acquire videogames from a game publisher 102. For example, they may each acquire a copy of the same videogame, or they may each acquire authorization to play a hosted version of the same videogame. The videogame broadcaster 110 and videogame viewer 112 may acquire the videogame through a fulfillment service 106. Note that in some cases, the videogame viewer 112 may not initially possess the videogame, but may instead acquire the videogame using various aspects described herein.

The videogame viewer 112 may interact with a broadcaster portal 114. Generally speaking, the broadcaster portal 114 provides a user interface, such as a web page, to viewers of a videogame broadcast or viewers of archived broadcasts or other related content. The broadcaster portal 114 may include a server that provides an interface to videogame streams provided by the videogame broadcaster 110 and the videogame streaming service 108. The broadcaster portal 114 may receive information about the content of a videogame stream originating from the videogame broadcaster 110. For example, while videogame viewer 112 is viewing a stream of a videogame played by videogame broadcaster 110, the broadcaster portal 114 may receive from the fulfillment service 106 information indicative of game content viewable in the stream and purchasable through the fulfillment service 106. The information may be identified, for example, by a component of the videogame services platform 100 which identifies game content present in the stream. Operation of this aspect is further discussed in FIG. 4.

The broadcaster portal 114 may provide an indication that the game content is available and that it may be incorporated into the gameplay of the videogame viewer 112. For example, the broadcaster portal 114 might receive an indication that game content that has been displayed in the stream—such as a weapon, opponent, character, event, or level—is available for purchase. The broadcaster portal 114 might then display a graphical indication, or otherwise provide notice, that the item is available.

As noted, the videogame viewer 112 may also act as a device for playing videogames, and may be authorized or otherwise able to play the same videogame as videogame broadcaster 110. The user of videogame viewer 112 may therefore wish to utilize or experience various aspects of the game as played by the user of the videogame broadcaster 110. The videogame viewer 112, on behalf of its user, may interact with either broadcaster portal 114 or fulfillment service 106 to acquire the game content.

The publishing service 104 may receive game content data from game publisher 102. The game content data may comprise metadata or other information describing game content and identifying which game content may be available for sale. For example, game content such as graphical assets, levels, and in-game events might be associated with identifiers. The identifiers may be provided in metadata to the publishing service 104, which may then provide information to other components of the system, such as the videogame broadcaster 110, fulfillment service 106, and/or videogame streaming service 108.

In some instances, the game publisher 102 may identify certain content as being customizable by the videogame broadcaster associated with game console 110 and/or broadcaster portal 114. For example, the publisher might identify in-game items such as weapons, banners, armor, and so forth as being customizable by a broadcaster. The broadcaster might then select certain of these items and customize them. Accordingly, when the broadcaster plays and streams the videogame, the customized version of the content may be included in the stream. The viewer operating the game console 112 might wish to acquire the customized version of the content. The videogame services platform 100 might receive and complete an order for the customized version of the content. The videogame services platform might then cause the viewer game console 112 to be updated to enable use of the customized content. This may comprise receiving a copy of the customized version of the content and then causing the game data used by the viewer game console 112 to be updated to enable use of the customized content.

The content identifiers may be mapped to stock keeping units of products available for sale through the fulfillment service 106. The fulfillment service 106 may, for example, be in communication with an online store through which products may be purchased. Accordingly, the user of the videogame viewer 112 and broadcaster portal 114 may accept an offer to purchase a game content item viewable in the stream, be directed to the online store, and complete the purchase of the item. Upon purchase, the fulfillment service 106 may cause game content data associated with the version of the videogame used by the videogame viewer 112 to be updated, so that the purchased game content is available and authorized to be used.

Figure 2:
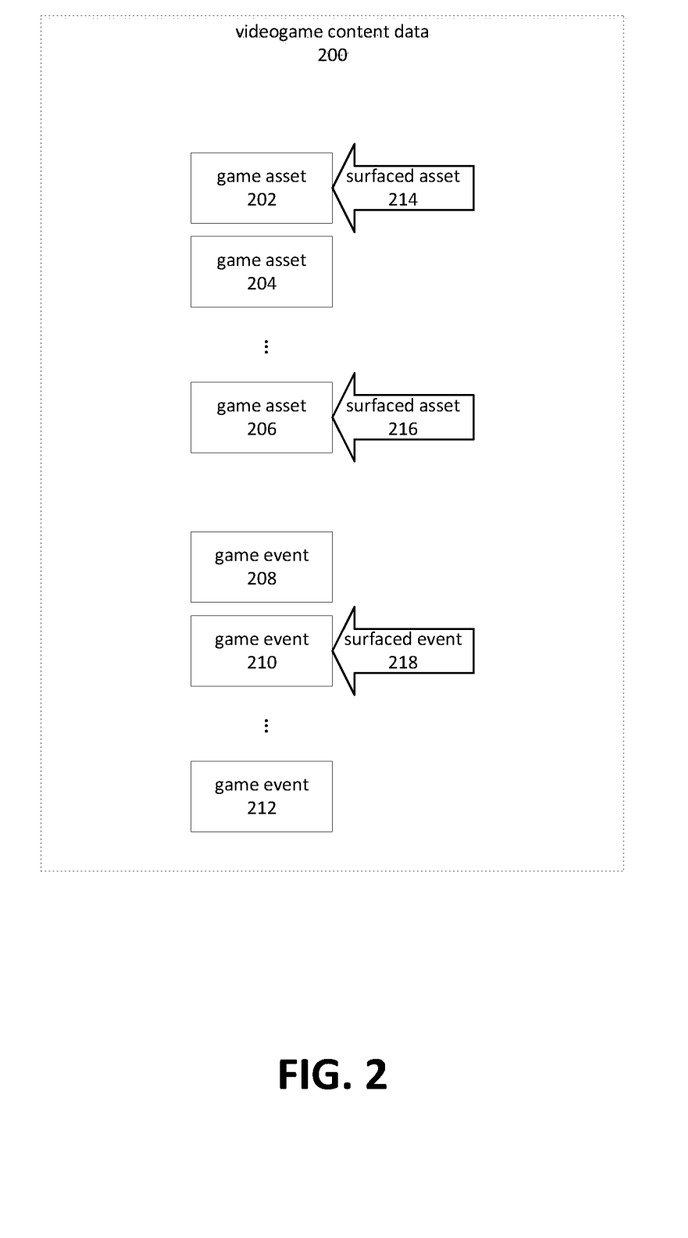
FIG. 2 is a block diagram depicting videogame content data

FIG. 2 is a block diagram depicting videogame content data 200. Game data may comprise various elements, such as the depicted game assets 202-206 and the depicted game events 208-212. The game assets 202-206 may comprise various elements of a game having an audio or video component, such as characters, skins, textures, levels, weapons, and other in-game objects. Each of the game assets 202-206 typically has one or more data elements corresponding to the asset. For example, game asset 202 might correspond to a character wireframe, game asset 204 might correspond to a music file, and game asset 206 might correspond to a texture bitmap.

The game events 208-212 may include aspects of the videogame experience that are occur over time and may not be tied to any particular asset or, alternatively, to a large number of assets. Examples include sequences of in-game actions such as an invasion of aliens, festivals which a character might attend, boss raids, and so forth. These events may generally be controlled by the computer-executable instructions that comprise the videogame's programming, although in some cases they might correspond to one or more script assets.

Certain of the game elements may be surfaced as potentially corresponding to content that may be acquired. For example, in FIG. 2 game assets 202, 206 and a game event 210 correspond to surfaced assets 214, 216 and surfaced event 218, respectively. The surfacing of an asset or event may comprise a mapping between the asset or event and an identifier. The mapping may, for example, be included in the videogame content data 200. In some cases, the mapping may be provided as metadata.

Figure 3:
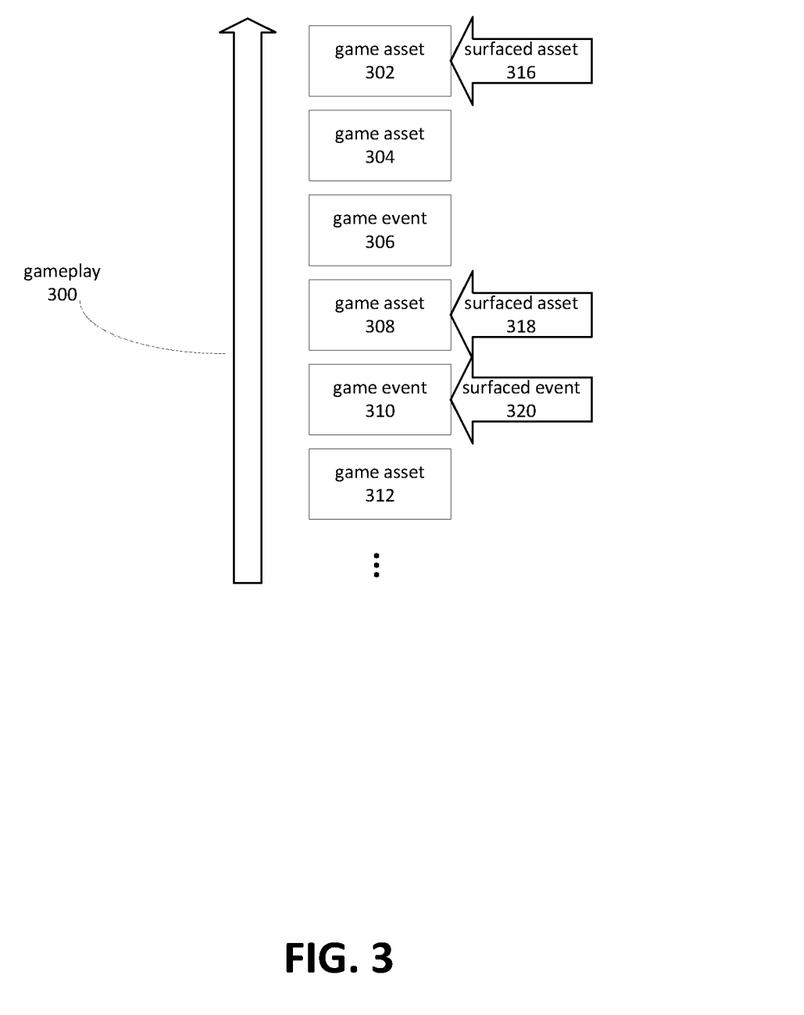
FIG. 3 is a block diagram depicting gameplay.

The content of a stream may correspond to a sequence of items and events ordered over game time. FIG. 3 is a block diagram depicting gameplay 300. A stream may comprise video and auditory components of the videogame experience. The gameplay 300 generally refers to sequences of action within the game, which may correspond to the video and auditory components included in the stream. For example, a monster corresponding to asset 302 might appear first in a stream, followed by a player character corresponding to game asset 304, then the commencement of a "boss fight" corresponding to game event 306, and so on.

As may be seen from FIG. 3, the various game assets 302, 304, 308, 312 and game events 306, 310 occur over the timeline of gameplay 300. Moreover, the timeline of gameplay 300 may correspond to a video and audio stream corresponding to gameplay 300. Certain of these events may be surfaced assets 316, 318 and surfaced events 310. Surfacing may refer to the assets and events being associated with an identifier which can be mapped to a stock keeping unit. Moreover, the surfacing may comprise the sending of data which allows a synchronized view of both the stream and the gameplay 300. In other words, a component of a game services platform, such as a client game console or streaming service, may identify surfaced assets and events as they appear in the stream and provide notification to other components of the videogame services platform. The notification may include identifiers of the surfaced assets that can be mapped to stock keeping units for enabling acquisition of the assets.

Figure 4:
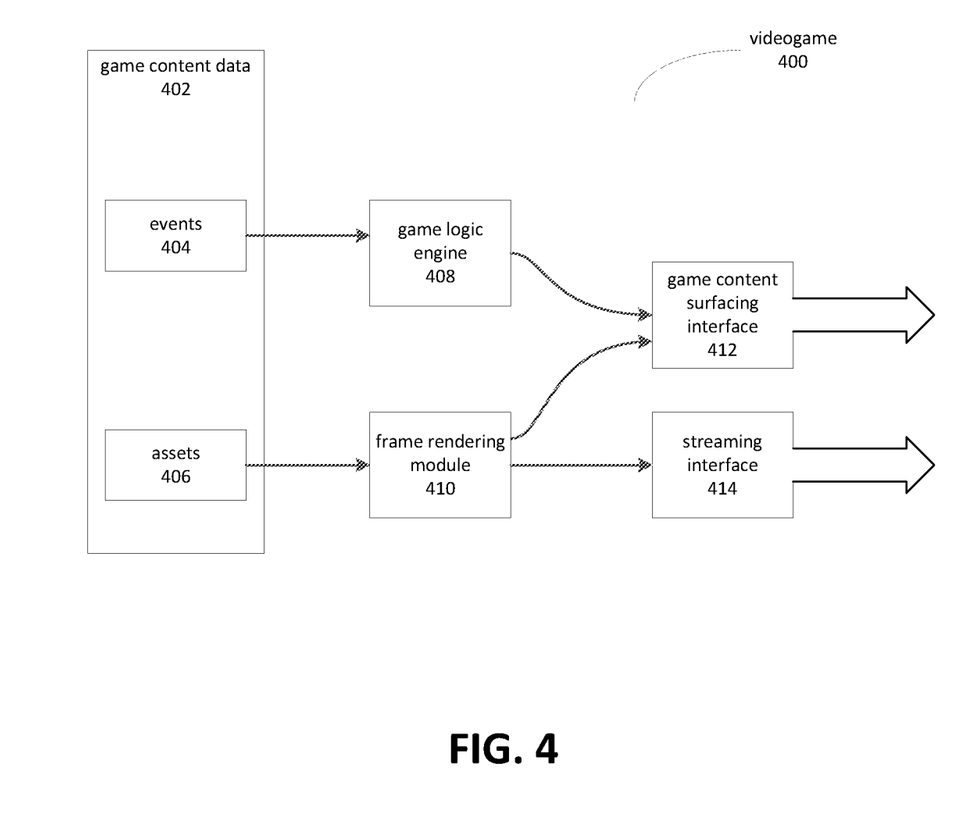
FIG. 4 is a block diagram depicting a videogame with components that identify surfaced assets.

FIG. 4 is a block diagram depicting a videogame 400 with components that identify surfaced assets. The videogame 400 may comprise game content data 402 including events 404 and assets 406. The events 404 may be partially or wholly represented by programming logic included in the game, or by various other elements such as scripts. Assets 406 might also include various scripts, as well as other components such as bitmaps, textures, wireframe models, and so forth. Assets 406 and events 404 might also be treated as virtual elements, which is to say that they exist only to be surfaced.

A game logic engine 408 may generally be responsible for implementing the gameplay of the game. For example, the game logic engine might receive player input, calculate character movement, determine character positions, identify collisions, and so forth. Typically, the game logic engine 408 will update various data structures that represent the game state.

As the game logic engine 408 performs these operations, it may identify certain events and assets as they are utilized. The game logic engine may identify event and asset content and associate the content with the current frame, so that timing information for the asset's use may be determined. An identifier of the content might also be obtained at this stage. The game logic engine 408 may then indicate, to the game content surfacing interface 412, that content has been utilized to render a particular frame. The game logic engine 408 might also provide the identifier. This information may be supplied to the game content surfacing interface 412. The game content surfacing interface 412 may then send the information to other components of the videogame surfacing platform.

A frame rendering module 410 may then render a frame of the game based on the game state. Typically, the game logic engine 408 updates the game state many times each second, according to a desired frame rate. Similarly, the frame rendering module 410 renders frames based on the game state many times a second. The frames may be provided to a streaming interface 414, which may send the rendered frames on to a videogame streaming service, where the frames may then be sent to a viewer.

The frame rendering module 410 may also identify assets 406 utilized to render the frames. For example, as frame rendering module 410 renders a scene based on the game state, it may determine that a certain texture or wireframe is in use. If the texture or wireframe is marked as one that should be surfaced, the frame rendering module 410 might notify the game content surfacing interface 412. The frame rendering module 410 might, for example, obtain an identifier of the asset and provide the identifier to the game content surfacing interface 412.

Figure 5:
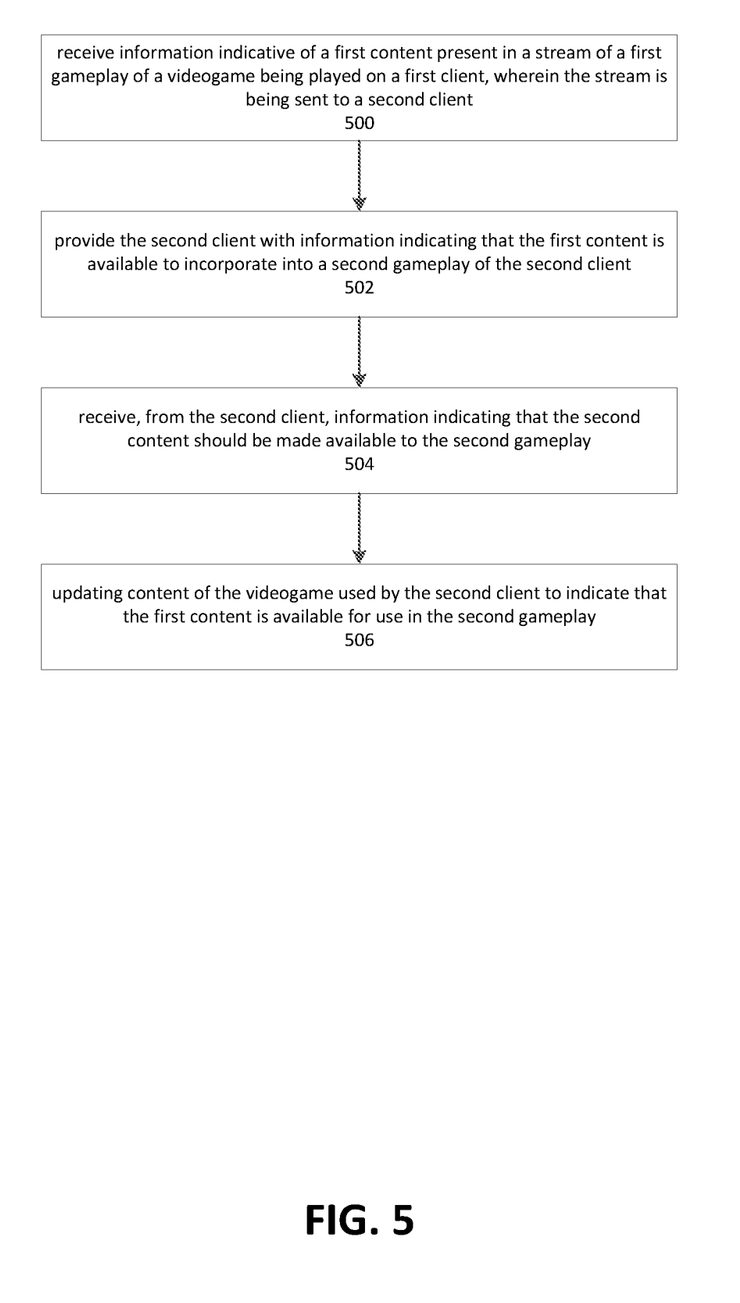
FIG. 5 is a flow diagram depicting operation of a videogame services platform.

FIG. 5 is a flow diagram depicting operation of a videogame services platform. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel.

Block 500 depicts the videogame services platform receiving information indicative of a first content—such as an asset or game event—being present in a stream of gameplay occurring on a first client. The first client may correspond to a device of a game broadcaster. The first client may, for example, be a videogame console. The stream may be transmitted from the first client to the second client. In some instances, the stream may be transmitted from the first client to the second client by way of a videogame streaming service. The videogame streaming service may, for example, provide load balancing, scaling, and multiplexing services. In some instances, the videogame streaming service may provide one-to-many broadcasts of the gameplay, so that many clients may view the broadcaster's gameplay.

Block 502 depicts the videogame services platform providing the second client with information indicating that the first content is available to incorporate into the gameplay of the second client. For example, the second client might have an installed or otherwise accessible version of the same game. The second client might then be provided with a notification that the game content is available for purchase at an online store.

Block 504 depicts that the gaming services platform may receive, from the second client, information indicating that the second content should be made available to gameplay that may occur on the second client. The second client might, for example, initiate a purchase through an online store. The purchase may be conducted by identifying a stock keeping unit based on an identifier of the content. For example, if the content is a texture or set of textures, one or more identifiers corresponding to the textures might be obtained, and then mapped to one or more stock keeping units. The mapping might be one-to-one, so that a given texture may be purchased individually, or many-to-one, such that a number of textures may be purchased through a sale associated with a single stock keeping unit. With reference to FIG. 1, the second client might also provide an indication to either the broadcaster portal 114, or to the fulfillment service 106, that the first content should be purchased or otherwise acquired.

Block 506 depicts the videogame services platform updating content of the videogame, as used by the second client, to make the content available for use in the second client's gameplay. This may comprise authorizing the content to be used by the second client. In some cases, for example, the content may be included in the game but not authorized. In other cases, the content may be downloaded by the fulfillment service 106 to the second client, and then marked as authorized for use.

In some instances, a complete videogame may be acquired for use by the second client. The videogame and all associated content may, in some cases, be downloaded to the second client. In some cases, the videogame may be authorized for use—for example when the videogame primarily executes at a data center remote to the second client. The first content may, accordingly, be associated with an identifier that maps to a stock keeping unit or other product code corresponding to a complete game.

Figure 6:
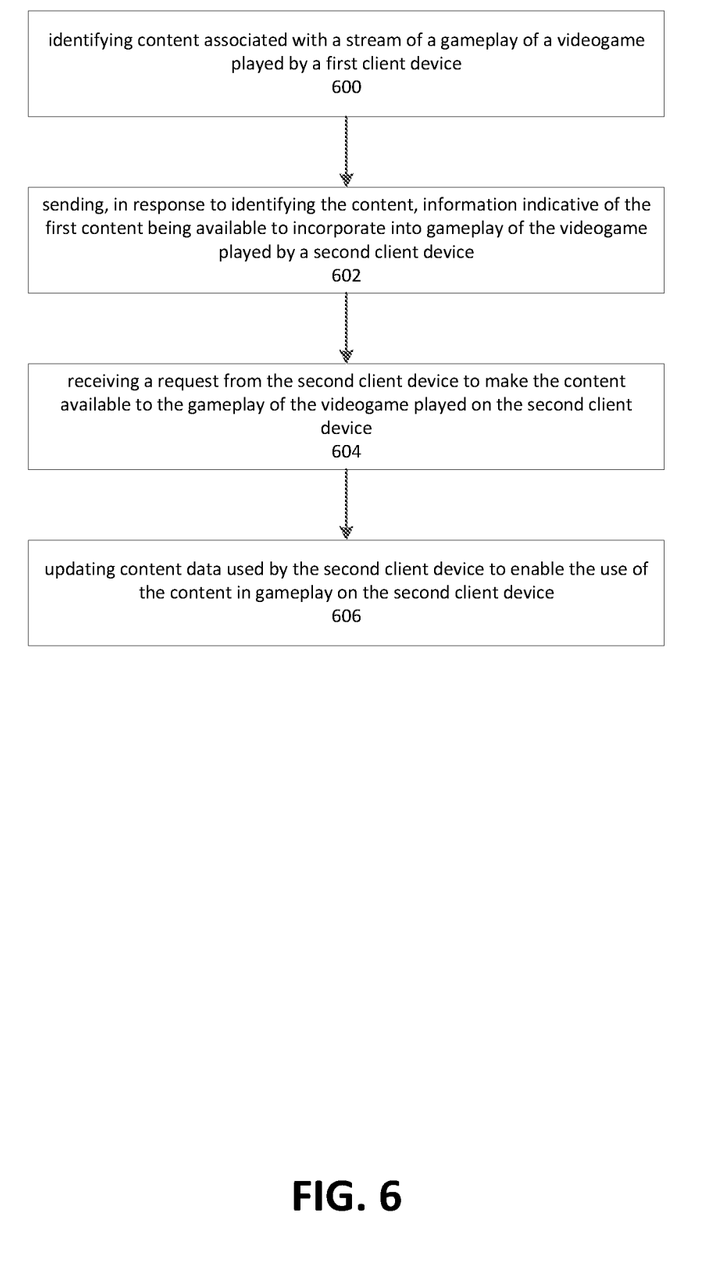
FIG. 6 is a flow diagram depicting a process for operating a game content platform.

FIG. 6 is a flow diagram depicting a process for operating a game content platform. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel.

Block 600 shows identifying content associated with a stream of gameplay of a videogame played on a first client device. The first client device may, for example, be a game console, tablet, or personal computer of a video game broadcaster. The first client device may therefore be considered as the origin of the gameplay. Note that in some cases, the game engine may be operated remotely, for example in a remote data center. However, the first client device may nevertheless be considered the originating device of the gameplay in such instances, since the inputs controlling play are obtained by the first client device.

The identifying may be performed by receiving metadata corresponding to the video and audio stream of the gameplay. For example, as depicted in FIG. 4, a videogame 400 may comprise a game content surfacing interface 412 for identifying content items associated with a stream of gameplay.

Block 602 depicts sending information indicative of the content being available to incorporate into gameplay of the videogame when played on a second client device. The information may be sent in response to identifying the content in the stream. Doing so allows for contemporaneous presentation of an offer to acquire the content with the appearance of the content in a stream of the gameplay.

Block 604 depicts receiving a request from the second client device to make the content available for the gameplay of the videogame when played on the second client device. The request may comprise an identifier of the content that may be mapped to a stock keeping unit. Alternatively, the identifier of the content may have been previously converted to a stock keeping unit using an interface to a fulfillment system. In either case, the identifier of the content is mapped to a stock keeping unit corresponding to a product that contains the content. The product may contain only the specific content, or the product may contain a bundle of content including the content identified in the stream.

Block 606 depicts updating content data used by the second client device so that the content may be used in gameplay. This may comprise downloading and storing the content in the game content data used by the second client device. In some instances, it may comprise updating the game content data to indicate that the use of the content is authorized.

Figure 7:
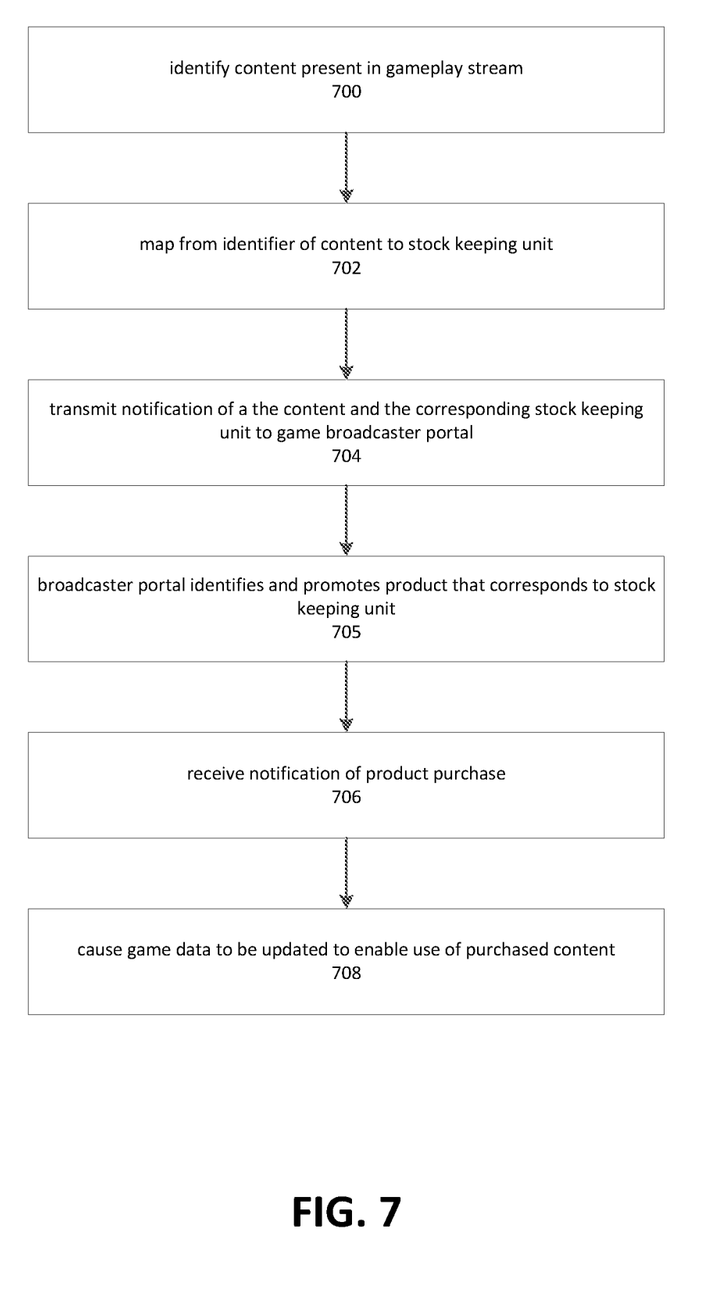
FIG. 7 is a flow diagram depicting a process of integrating content acquisition into a game broadcast portal.

FIG. 7 is a flow diagram depicting a process of integrating content acquisition into a game broadcast portal. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel.

Block 700 depicts a videogame services platform identifying content present in a gameplay stream. The gameplay stream may, for example, be associated with a first client device on which the broadcaster is (or has) played the videogame. The gameplay stream may be viewable on a portal website associated with the broadcaster. For example, the portal website may contain a "live streaming" section in which the broadcasters gameplay may be viewed as it occurs. The portal website might also contain an "archive" section containing videos of past gameplays. In either case, metadata containing identifiers of content may be linked to, embedded, or otherwise associated with points in time on the stream.

Block 702 depicts mapping from an identifier of content viewable in a live or recorded stream to a stock keeping unit. Then, as depicted by block 704, a notification comprising information describing the content and one or more corresponding stock keeping units may be providing to the game broadcaster portal. In particular, one or more servers operating the game broadcaster portal may be provided with the information, with which updating portal pages may be generated. The updated portal pages may contain text, links, or other indicia indicating to users of the portal that the content may be acquired. For example, a portal page might be updated to include a link to a site at an online store where the product containing the content may be acquired.

In some instances, as depicted by block 705, the broadcaster portal may identify a product based on the stock keeping unit included in the notification. In some cases, the notification may include a number of stock keeping units corresponding to a variety of products. There may also be a number of notifications from which a particular product may be identified. The broadcaster portal may, for example, provide the broadcaster with graphical notifications of products represented in the stream. The broadcaster portal might then solicit and/or accept input from the broadcaster indicating which of the products should be promoted. A product so identified might then be promoted in various ways. For example, the broadcaster might mention the product's availability in an audio program simulcast with the streaming of the videogame. In some instances, and identified product might be promoted through advertisements on the broadcaster portal page.

In some cases, account data associated with the broadcaster may be updated to credit the broadcaster with originating the sale. For example, the broadcaster's account data might be updated with a monetary credit corresponding to a percentage of the sale.

At block 706, the videogame services platform may receive notification that a product containing the content has been acquired by a user of a second client device. In response, as depicted by block 708, the videogame services platform may cause game data to be updated so that the purchaser of the content may participate in gameplay that comprises the purchased content. For example, game data accessible to the second client device may be updated so that the content is available and authorized for use.

Aspects of the present disclosure may be applied to content services other than videogames, such as sporting events, concerts, and so forth. In an example, an original provider of content may provide an audio or video recording or stream of the content. For example, the provider may supply a video recording of a sporting event to a content services platform. Another party, similar to the videogame broadcaster, may operate a portal which provides access to the video recording. A viewer may utilize the portal to view the video recording, and may acquire relevant or customized content through the portal. For example, the portal might represent a "fan" site for the video game, and permit the sale of additional videos, physical items such as t-shirts and hats, and so forth, through the portal. These items may be provided or customized by the operator of the portal.

The provider of the content may supply metadata in addition to the original content identifying items and events that are perceivable in the content. For example, if the video recording was of a basketball game, the metadata might describe a basketball, a suit worn by a coach, and sneakers worn by a player. The metadata might further comprise timing information so that items that are on-screen may be matched to items described by the metadata. The content services platform might provide facilities to enable the portal site to receive notifications of available content, to allow the portal operator to identify customizable content and to identify content that may be acquired by the users of the portal page, and services for fulfilling acquisition of purchased content.

Figure 8:
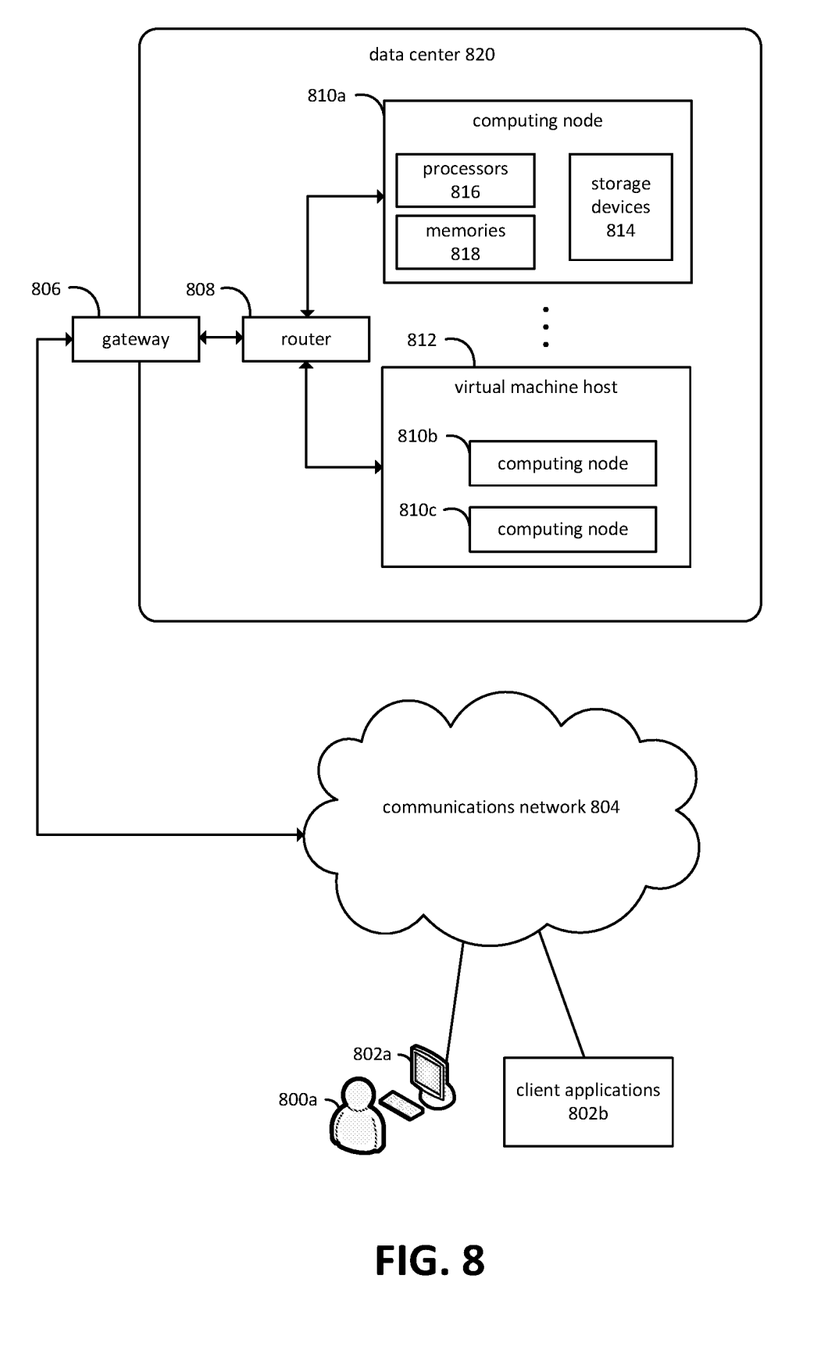
FIG. 8 is a block diagram depicting an embodiment of a computing environment in which aspects of the present disclosure may be practiced.

FIG. 8 is a diagram depicting an example of a distributed computing environment on which aspects of the present invention may be practiced. Various users 800a may interact with various client applications, operating on any type of computing device 802a, to communicate over communications network 804 with processes executing on various computing nodes 810a, 810b, and 810c within a data center 820. Alternatively, client applications 802b may communicate without user intervention. Communications network 804 may comprise any combination of communications technology, including the Internet, wired and wireless local area networks, fiber optic networks, satellite communications, and so forth. Any number of networking protocols may be employed.

Communication with processes executing on the computing nodes 810a, 810b, and 810c, operating within data center 820, may be provided via gateway 806 and router 808. Numerous other network configurations may also be employed. Although not explicitly depicted in FIG. 8, various authentication mechanisms, web service layers, business objects, or other intermediate layers may be provided to mediate communication with the processes executing on computing nodes 810a, 810b, and 810c. Some of these intermediate layers may themselves comprise processes executing on one or more of the computing nodes. Computing nodes 810a, 810b, and 810c, and processes executing thereon, may also communicate with each other via router 808. Alternatively, separate communication paths may be employed. In some embodiments, data center 820 may be configured to communicate with additional data centers, such that the computing nodes and processes executing thereon may communicate with computing nodes and processes operating within other data centers.

Computing node 810a is depicted as residing on physical hardware comprising one or more processors 816, one or more memories 818, and one or more storage devices 914. Processes on computing node 810a may execute in conjunction with an operating system or alternatively may execute as a bare-metal process that directly interacts with physical resources, such as processors 816, memories 818, or storage devices 814.

Computing nodes 810b and 810c are depicted as operating on virtual machine host 812, which may provide shared access to various physical resources, such as physical processors, memory, and storage devices. Any number of virtualization mechanisms might be employed to host the computing nodes.

The various computing nodes depicted in FIG. 8 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 9:
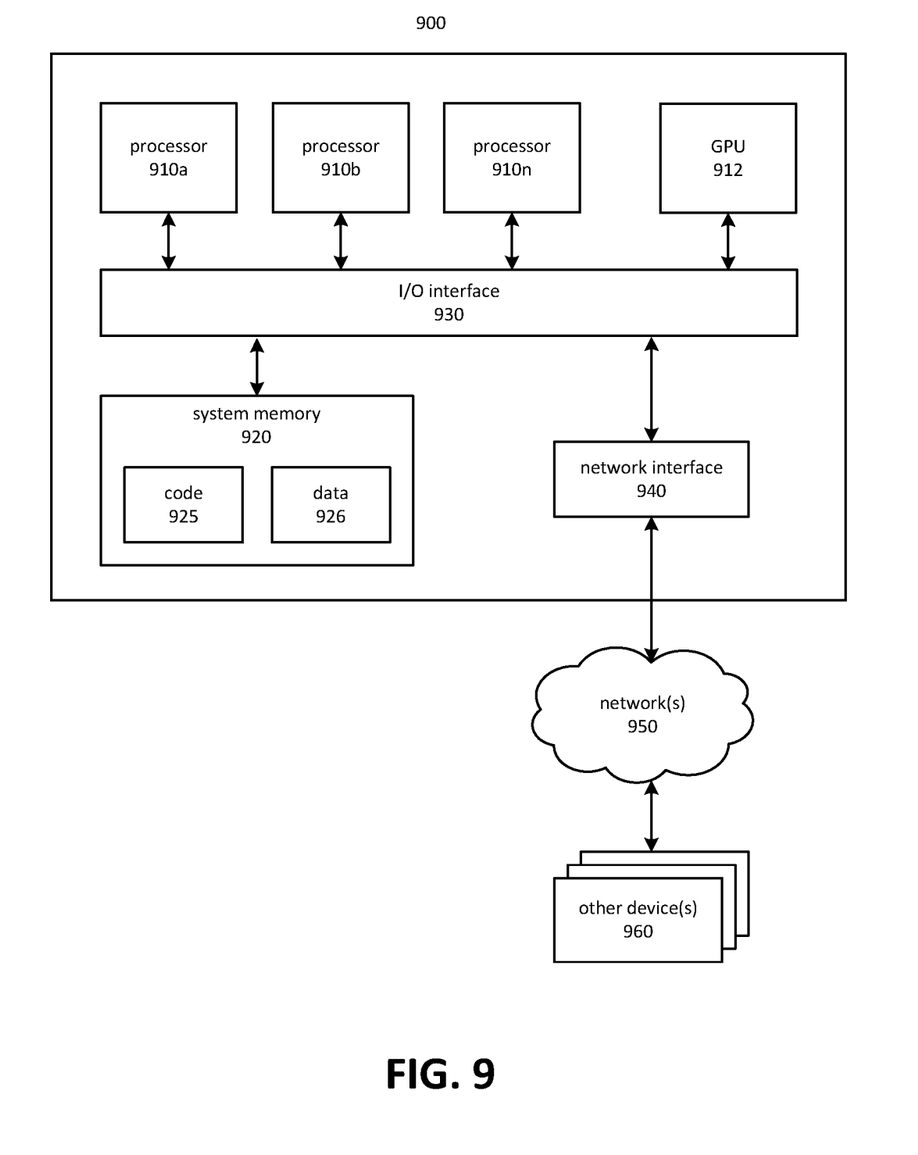
FIG. 9 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 9 depicts a general-purpose computer system that includes or is configured to access one or more computer-accessible media. In the illustrated embodiment, computing device 900 includes one or more processors 910a, 910b, and/or 910n (which may be referred herein singularly as a processor 910 or in the plural as the processors 910) coupled to a system memory 920 via an input/output ("I/O") interface 930. Computing device 900 further includes a network interface 940 coupled to I/O interface 930.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures ("ISAs"), such as the x86, PowerPC, SPARC or MIPS ISAs, or any other suitable ISA. In multiprocessor systems, each of processors 910 may commonly, but not necessarily, implement the same ISA.

In some embodiments, a graphics processing unit ("GPU") 1012 may participate in providing graphics rendering and/or physics processing capabilities. A GPU may, for example, comprise a highly parallelized processor architecture specialized for graphical computations. In some embodiments, processors 910 and GPU 912 may be implemented as one or more of the same type of device.

System memory 920 may be configured to store instructions and data accessible by processor(s) 910. In various embodiments, system memory 920 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 920 as code 925 and data 926.

In one embodiment, I/O interface 930 may be configured to coordinate I/O traffic between processor 910, system memory 920, and any peripherals in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect ("PCI") bus standard or the Universal Serial Bus ("USB") standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computing device 900 and other device or devices 960 attached to a network or networks 950, such as other computer systems or devices, for example. In various embodiments, network interface 940 may support communication via any suitable wired or wireless general data networks, such as types of Ethernet networks, for example. Additionally, network interface 940 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 920 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 900 via I/O interface 930. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 900 as system memory 920 or another type of memory. Further, a computer-accessible medium may include transmission media or signals, such as electrical, electromagnetic or digital signals, conveyed via a communication medium, such as a network and/or a wireless link, such as those that may be implemented via network interface 940. Portions or all of multiple computing devices, such as those illustrated in FIG. 9, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/ or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
one or more computing nodes comprising memory that at least:
receive information indicative of a video stream of a first gameplay of a videogame operated on a first client device, the first gameplay originating from the first client device, the video stream sent from the first client device to a second client device;

identify a first content of the first gameplay included in the video stream sent to the second client device, wherein identifying the first content comprises determining that the first content is included in a first frame of a plurality of frames that are rendered by the videogame operated on the first client device, and wherein the identifying the first content further comprises providing an indication that the first content is included in the first frame;

in response to the identifying the first content, send the second client device information indicative of the first content being available to incorporate into a second gameplay of the second client device;

receive information indicative of making the first content available to the second gameplay; and update content accessible to the second client device to enable use of the first content in the second gameplay of the second client device.

2. The system of claim 1, wherein the one or more computing nodes at least:

receives information indicative of a request to make the first content available to the second gameplay, the request comprising a first identifier associated with the first client device and a second identifier uniquely identifying the first content.

3. The system of claim 1, wherein a stock keeping unit is associated with the first content, the stock keeping unit corresponding to a product purchasable at an online store.

4. The system of claim 3, wherein the one or more computing nodes at least:

receives, from the online store, information indicative of a completed purchase of the product.

5. The system of claim 1, wherein the one or more computing nodes at least:

sends information indicative of the first content being identified in the video stream to a second one or more computing nodes, wherein the second one or more computing nodes generates a user interface comprising a view of the video stream and graphical indicia of the first content being available for incorporation into the second gameplay.

6. A method comprising:

identifying a first content in a video stream of a first gameplay of a videogame, the first gameplay originating from a first client device, the videogame operated on the first client device, the video stream being transmitted from the first client device to a second client device, wherein identifying the first content comprises determining that the first content is included in a first frame of a plurality of frames that are rendered by the videogame operated on the first client device, and wherein the identifying the first content further comprises providing an indication that the first content is included in the first frame;

sending, in response to the identifying the first content, information indicative of the first content being available to incorporate into a second gameplay by the second client device;

receiving, from the second client device, information indicative of a request to make the first content available to the second gameplay; and updating content data accessible to the second client device to enable use of the first content in the second gameplay of the second client device.

7. The method of claim 6, wherein the request comprises a first identifier associated with the first client device and a second identifier uniquely identifying the first content.

8. The method of claim 6, further comprising:

associating a first identifier with the first content;

associating a second identifier with the first client device; and resolving the request to make the first content available to the second gameplay by at least identifying a stock keeping unit corresponding to the first identifier and updating an account corresponding to the second identifier with information indicative of the first client device originating the request.

9. The method of claim 6, further comprising:

sending information indicative of the first content being identified in the video stream to a second one or more computing nodes, wherein the second one or more computing nodes generates a user interface comprising a view of the video stream and graphical indicia of the first content being available for incorporation into the second gameplay.

10. The method of claim 6, further comprising:

associating a plurality of content identifiers with a stock keeping unit, the plurality of content identifiers comprising a first identifier corresponding to the first content; and updating the content data accessible to the second client device with information indicative of authorization to use the first content in response to receiving information indicative of a completed transaction for the stock keeping unit.

11. The method of claim 6, further comprising:

receiving, from a second one or more computing nodes sending the video stream of the first gameplay to the second client device, information indicative of a plurality of content transmitted over the video stream of the first gameplay.

12. The method of claim 6, further comprising:

associating the first content with a stock keeping unit, wherein a product corresponding to the stock keeping unit comprises the first content and a physical item;

updating the content data accessible to the second client device to enable use of the first content; and initiating a fulfillment process for the physical item.

13. A non-transitory computer-readable storage medium having stored thereon instructions that, upon execution by one or more computing devices, cause the one or more computing devices to perform operations comprising:

determining that a first content was represented in a video stream of a first gameplay of a videogame broadcast to a second client device, the first gameplay originating from a first client device, the videogame operated on the first client device, wherein the determining comprises identifying that the first content is included in a first frame of a plurality of frames that are rendered by the videogame operated on the first client device, and wherein the identifying the first content further comprises providing an indication that the first content is included in the first frame;

sending information indicative of the first content being available to include in a second gameplay by the second client device;

receiving, from the second client device, information indicative of a request to make the first content available to the second gameplay; and updating content data accessible to the second client device with information indicative of enabling use of the first content in the second gameplay of the second client device.

14. The non-transitory computer-readable storage medium of claim 13, wherein the request originates from the second client device.

15. The non-transitory computer-readable storage medium of claim 13, wherein the operations further comprise:
   associating a first identifier with the first content;
   associating a second identifier with the first client device; and
   resolving the request to make the first content available to the second gameplay by at least identifying a stock keeping unit corresponding to the first identifier and updating an account corresponding to the second identifier with information indicative of the first client device originating the request.

16. The non-transitory computer-readable storage medium of claim 13, wherein the operations further comprise:
   receiving information indicative of a completed purchase of a product comprising authorization to use the first content in the second gameplay.

17. The non-transitory computer-readable storage medium of claim 13, wherein the operations further comprise:
   sending information indicative of the first content being identified in the video stream to a second one or more computing nodes, wherein the second one or more computing nodes generates a web page comprising a view of the video stream and graphical indicia of the first content being available for incorporation into the second gameplay.

18. The non-transitory computer-readable storage medium of claim 13, wherein the operations further comprise:
   receiving a version of the first content, the version customized by a user of the first client device; and
   updating the content data accessible to the second client device to enable use of the version of the first content, in response to receiving the information indicative of the request to make the first content available to the second gameplay.

19. The non-transitory computer readable storage medium of claim 18, wherein the first content is associated with information indicative of the first content being customizable by a broadcaster.

20. The non-transitory computer-readable storage medium of claim 19, wherein the information indicative of the plurality of content is generated by the first client device.

* * * * *